United States Patent [19]

Sawase et al.

[11] Patent Number: 5,175,840
[45] Date of Patent: Dec. 29, 1992

[54] MICROCOMPUTER HAVING A PROM INCLUDING DATA SECURITY AND TEST CIRCUITRY

[75] Inventors: Terumi Sawase, Sayama; Hideo Nakamura, Himodemachi; Yoshimune Hagiwara, Hachioji; Toshimasa Kihara, Tachikawa; Kiyoshi Matsubara, Kodaira; Tadashi Yamaura, Kokubunji, all of Japan

[73] Assignee: Hitachi, Ltd., Tokyo, Japan

[21] Appl. No.: 726,113

[22] Filed: Jun. 21, 1991

Related U.S. Application Data

[63] Continuation of Ser. No. 387,383, Jul. 31, 1989, abandoned, which is a continuation of Ser. No. 914,674, Oct. 2, 1986, abandoned.

[30] Foreign Application Priority Data

Oct. 2, 1985 [JP] Japan ............... 60-217844

[51] Int. Cl.⁵ .............. G06F 12/14; G11C 29/00
[52] U.S. Cl. ............... 395/425; 365/195; 365/228; 365/201; 371/21.1; 364/DIG. 1; 364/246.6; 364/969
[58] Field of Search ......... 365/104, 185, 189.01, 365/195, 201, 218, 228; 371/15.1, 21.1; 380/4; 395/425; 364/200 MS File, 900 MS File

[56] References Cited

U.S. PATENT DOCUMENTS

| | | | |
|---|---|---|---|
| 4,298,934 | 11/1981 | Fischer | 364/200 |
| 4,384,326 | 5/1983 | Devchoudhury | 364/200 |
| 4,430,709 | 2/1984 | Schleupen | 364/200 |
| 4,521,853 | 6/1985 | Guttag | 364/200 |
| 4,578,774 | 3/1986 | Muller | 365/195 |
| 4,593,384 | 6/1986 | Kleijne | 365/228 |
| 4,648,076 | 3/1987 | Schrenk | 365/218 |
| 4,698,750 | 10/1987 | Wilkie et al. | 365/185 |
| 4,744,062 | 5/1988 | Nakamura et al. | 365/228 |

Primary Examiner—Glenn Gossage
Attorney, Agent, or Firm—Antonelli, Terry, Stout & Kraus

[57] ABSTRACT

Easy testability and data security of an electrically erasable programmable read only memory (EEPROM) can be accomplished by disposing pads and an input/output (I/O) circuit providing addresses, data and control signals necessary for the EEPROM test on a semiconductor substrate and by disposing a two-level test I/O interception circuit consisting of an EEPROM device on the substrate such that once the testing is completed, unauthorized accessing is prevented from outside the semiconductor substrate as a result of having a built-in data security function. A microcomputer having this capability is provided with a central processing unit (CPU) for processing data, a memory, such as an EEPROM, which is internally communicating through a common bus (which transmits data, address and control signals) with the CPU, other than during a test mode, and first and second inhibition circuits which provide the security. The first inhibition circuit is coupled to the data bus and provides a first inhibition operation to prevent access operations to the memory. The first inhibition circuit release the first inhibiting operation in accordance with a signal from outside the semiconductor substrate or body. The second inhibition means is coupled to the data bus and provides a second inhibiting operation to prevent access operations to the memory from outside the semiconductor body via the data bus and permanently disables the access operations to the memory irrespective of a releasing or termination of the first inhibiting operation after the second inhibiting operation has taken effect.

13 Claims, 7 Drawing Sheets

| CONTROL SIGNAL / MODE | $\overline{CE}$ | $\overline{OE}$ | $\overline{WE}$ | CM | ECR READ/WRITE | | ECR READ ONLY |
|---|---|---|---|---|---|---|---|
| | | | | | WI | EI | $\overline{BSr}$ |
| STAND BY | H | — | — | L | — | — | H |
| READ | L | L | H | L | — | — | H |
| WRITE 1 | L | H | L | L | L | L | H→L |
| WRITE 2 | L | H | L | L | L | H | H→L |
| PAGE ERASE | L | H | L | L | H | L | H→L |
| ERASE/WRITE INHIBIT | L | H | L | L | H | H | H→L |
| DATA POLLING | L | L | H | L | — | — | L |
| SEEP READ | L | L | H | L | — | — | H |
| SEEP WRITE | L | H | L | L | L | L | H→L |
| CHIP ERASE | L | H | L | H | L | L | H→L |
| CHIP WRITE | L | H | L | H | L | L | H→L |

MICROCOMPUTER HAVING A PROM INCLUDING DATA SECURITY AND TEST CIRCUITRY

This application is a continuation of application Ser. No. 07/387,383, filed on Jul. 31, 1989, now abandoned, which in turn is a continuation application of Ser. No. 06/914,674, filed Oct. 2, 1986, now abandoned.

BACKGROUND OF THE INVENTION

This invention relates generally to a semiconductor integrated circuit, and more particularly to a semiconductor integrated circuit effecting data security for and EEPROM (Electrically Erasable and Programmable Read Only Memory) in a microcomputer with a built-in EEPROM memory.

Among conventional microcomputers with a built-in EEPROM, a system capable of data security and disabling of the EEPROM thereby preventing the storing of a program by the operation from outside a semiconductor integrated circuit is known, such as with respect to the operation of the microcomputer announced by the Seeq Company in the ISSCC '83 in an article entitled "A 5 V Self-Adaptive Microcomputer With 16 Kb of $E^2$ Program Storage and Security", by M. Bagula et al., published in the Digest of Technical Papers (IEEE-ISSCC Feb. 1983), on pages 34-35, wherein one of the registers in such a microcomputer is assigned as a data security EEPROM. Though easily operable, this sytem does not pay any consideration as to how to permanently maintain the EEPROM data.

SUMMARY OF THE INVENTION

In semiconductor integrated circuits of microcomputers or the like having the EEPROM formed on the same semiconductor substrate, the present invention is directed to provide easy testability of the built-in EEPROM and data security of the EEPROM after the test.

It is another object of the present invention to provide expansion of an EEPROM write function.

The objects of the invention described above can be accomplished by the following circuit construction. Namely, easy testability and data security can be accomplished by disposing pads and an input/output (I/O) circuit for providing an address, data and a control signal necessary for the test on a semiconductor substrate and by disposing a two-level test I/O interception circuit on the substrate consisting of an EEPROM device for inhibiting access by the test I/O circuit after completion of the test.

Expansion of the write function of the EEPROM can be accomplished by disposing a control register for controlling the EEPROM.

In the drawings, reference numerals represent the following circuit elements, respectively:

1 ... semiconductor substrate,
2 ... CPU,
3 ... RAM,
4 ... ROM,
5 ... EEPROM,
6 ... bus,
7 ... I/O,
8 ... test circuit,
9 ... EEPROM module,
10 ... EEPROM memory matrix,
11 ... X decoder,
12 ... Y selector,
13 ... address latch,
14 ... address buffer,
15 ... address bus,
16 ... sense amplifier,
17 ... data bus,
18 ... data buffer,
19 ... data latch,
20 ... EEPROM control circuit,
21 ... control signal buffer,
22 ... control signal latch,
23 ... control signal generated by CPU,
24 ... test port,
25 ... EEPROM for security,
26 ... decoder,
27 ... security circuit,
28 ... ECR,
29 ... synchronization circuit,
30 ... write inhibition signal,
31 ... column latch,
50 ... ENOR circuit,
51 ... AND circuit,
52 ... power-up reset circuit,
53 ... delay circuit,
54 ... determination circuit.
55 ... voltage detection circuit,
56 ... power-up detection circuit,
57, 58 ... security circuit,
59 ... security bit,
60 ... protection circuit
61 ... flip-flop
70 ... EEPROM cell,
71, 72 ... isolation MOSFET,
73 ... load transistor (MOSFET),
74 ... inverter,
75 ... NAND circuit,
76 ... MOSFET,
77 ... inverter,
78 ... MOSFET,
100 ... EEPROM,
101 ... CPU,
102 ... address port,
103 ... data port,
104 ... security circuit,
AB ... address bus,
DB ... data bus.

DESCRIPTION OF THE PREFERRED EMBODIMENTS

Hereinafter, one embodiment of the present invention will be described with reference to the accompanying drawings.

Figure 1:
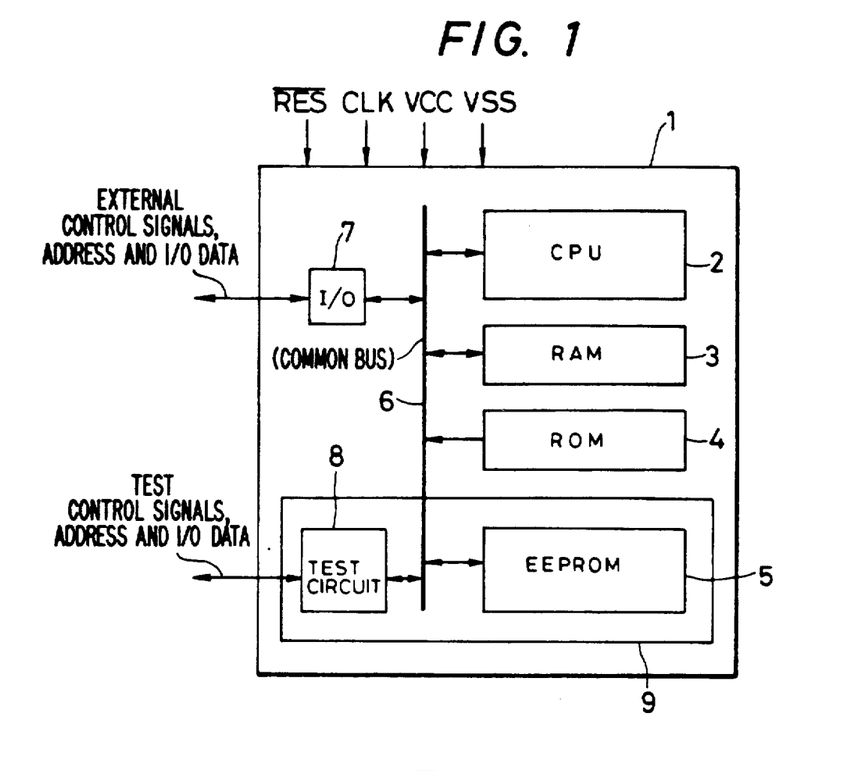
FIG. 1 is an overall structural view of a microcomputer.

FIG. 1 shows the construction of a microcomputer representing one embodiment of the present invention, and all the circuits shown in the drawing are integrated on the same semiconductor substrate 1.

CPU 2, RAM 3, ROM 4 and an EEPROM 5 are connected to one another by a common bus 6 for transmitting addresses, data, control signals, and the like, and data communication with external devices or with equipment outside the semiconductor integrated circuit is effected through an I/O (input/output) circuit 7. A test circuit 8 for testing the EEPROM is added. When the EEPROM is tested, only an EEPROM module 9 is operative so that independent tests can be made while being isolated from the CPU, RAM and ROM.

Figure 2:
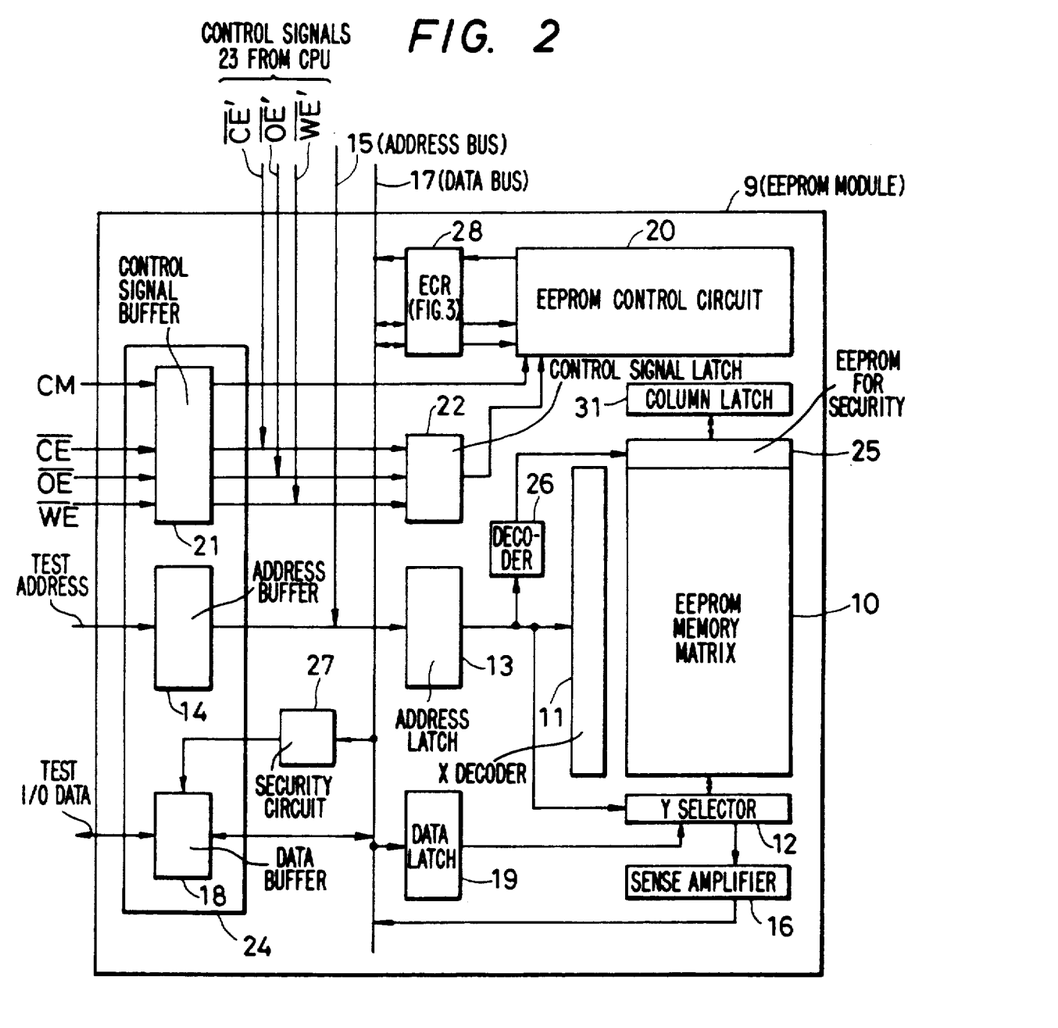
FIG. 2 is a structural view of an EEPROM block.

FIG. 2 shows the construction of the EEPROM module 9 described above. A memory matrix 10 containing 16,384-bit EEPROM memory cells has a 32 bytes (256 bits) by 64 pages construction. Each page is selected by the output of an X decoder 11 and each byte in each page is selected by a Y selector 12. In other words, an arbitrary byte (8 bits) is selected by the combination of the X decoder 11 and the Y selector 12. Each decoder is coupled to an address latch 13 for latching address information, and the input to the address latch 13 is provided from outside the semiconductor integrated circuit through an address buffer 14 in the test mode, and is also provided from the CPU, as the decoder is coupled to an address bus 15 of the microcomputer, at times other than in the test mode.

Data read-out and data write from and into the EEPROM matrix 10 in the test mode are implemented by control signals $\overline{CE}$, $\overline{OE}$ and $\overline{WE}$ provided from outside the semiconductor integrated circuit. The data path at this time is as follows. At the time of a data read operation, the data of the memory matrix 10 is inputted to the sense amplifier 16 through the Y selector 12, and the detected and amplified data is outputted outside the semiconductor integrated circuit through the data bus 17 and the data buffer 18 that is controlled in the output direction. The write data into the EEPROM is latched by the data latch 19 through the data buffer 18 that is controlled in the input direction and through the data bus 17, and is written into the EEPROM memory in accordance with the control timing that is generated by the EEPROM control signal circuit 20. The control signals $\overline{CE}$, $\overline{OE}$ and $\overline{WE}$ are latched by the control signal latch 22 through the control buffer 21 at the time of the write operation, and its output provides control information to the EEPROM control signal circuit 20.

On the other hand, data exchange at times other than during the test mode is directly made with the CPU through the data bus 17 of the microcomputer, and control is also effected in synchronism with the control signals 23 generated by the CPU.

As described above, write and read to and from the EEPROM from outside the semiconductor integrated circuit, that is, the EEPROM test, can be directly made easily during the test mode through the test port 24.

Further, in order to inhibit the outputting of the EEPROM data to the outside after the test is completed, that is, to accomplish the security function, the EEPROM module 9 of the present invention employs the following construction. In other words, a 32-byte EEPROM 25 for security is disposed separately from EEPROM 10 which stores the data. This EEPROM 25 is selected by the output of the decoder 26 and one byte among 32 bytes is selected by the Y selector 12. The data of the security EEPROM 25 is inputted to the security circuit 27 by the read operation through the Y selector 12, the sense amplifier 16 and the data bus 17, and the security circuit 27 in turn decodes the data of the EEPROM 25. If the data for which security must be secured is written, the security circuit 27 generates a security clock signal and inhibits the data I/O buffer 18 in the test mode. In other words, it directly inhibits the data input/output from the external terminals.

Another characterizing feature of this EEPROM is that it has an EEPROM control register (ECR) 28 for expanding the write function to the EEPROM.

Next, ECR 28 and the EEPROM mode will be described in detail with reference to FIGS. 3 and 4.

Figure 3:
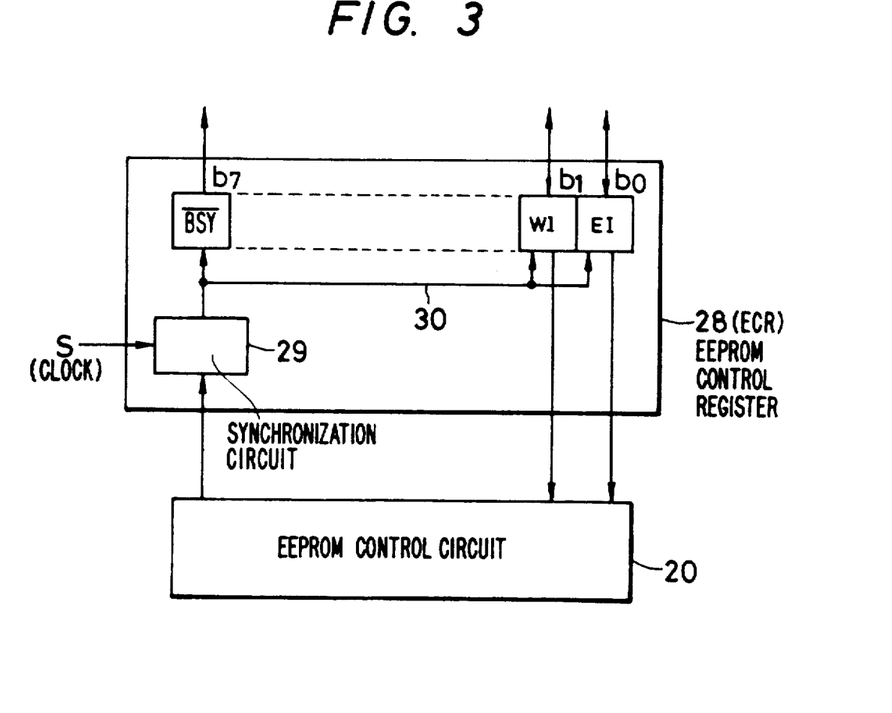
FIG. 3 is a structural view of an EEPROM control register.

FIG. 3 shows the construction of the EEPROM control register (ECR) 28. ECR is a 3-bit register disposed inside the address space of the microcomputer and direct access can be made thereto from the CPU through the data bus. Each bit has the following function.

EI: Erase Inhibit

It is a control flag of the EEPROM assigned to the bit 0 (b0) of the ECR, and provides the data which inhibits erase sequence of the EEPROM to the EEPROM control circuit 20 (inhibit when "1"). It is the flag that can be read and written from CPU.

WI: Write Inhibit

It is an EEPROM control flag assigned to the bit 1 (b1) of the ECR, and provides the data which inhibits the write sequence to the EEPROM to the EEPROM control circuit 20 (inhibit when "1"). It is the flag that can be read and written from the CPU. $\overline{BSY}$:

It is a flag assigned to the bit 7 (b7) of the EEPROM module for indicating a busy ECR, and represents that the EEPROM module is executing the erase or write sequence.

When $\overline{BSY}$ = "0", read/write to the EEPROM module becomes invalid.

The EEPROM control circuit 20 provides timing control as a result of its own clocking oscillator which is independent of the clock of the microcomputer, and is coupled to the $\overline{BSY}$ register through the synchronization circuit with the fundamental clock S in order to establish synchronization with the fundamental clock S. When $\overline{BSY}$ = "0", a write inhibition signal 30 is provided to the WI, EI registers in order to inhibit write to WI, EI.

Nex the write sequence of the EEPROM will be explained with reference to FIG. 4. The write sequence is started by the write control signal $\overline{CE}$ (or $\overline{CE}'$), $\overline{OE}$ (or $\overline{OE}'$) or $\overline{WE}$ (or $\overline{WE}'$) explained with reference to FIG. 2, and the write sequence is started when $\overline{WE}$ = "0" under the condition of $\overline{CE}$ = "0" and $\overline{OE}$ = "1".

(A) The 1-word (256 bits) data of EEPROM selected by the X decoder 11 or the decoder 26 shown in FIG. 2 is saved into the column latch 31 shown in FIG. 2.

(B) The $\overline{BSY}$ flag of the EEPROM control register ECR is set to "0" in order to notify to the outside that the EEPROM module is in the write sequence.

(C) The write data inputted from the data bus is transferred to the column latch 31 selected by the Y selector 12 through the data latch 19 shown in FIG. 2. In this operation, any byte can be inputted within the period of 500 μs from the time at which WE is first asserted. Therefore, it is possible to input the maximum 32-byte data to the column latch within 500 μs in synchronism with $\overline{WE}$ and to provide simultaneous write of 1 to 32 bytes in one write cycle. In this case, too, the data is transferred to the column latch 31

(one byte among 32 bytes) selected by the Y selector and is temporarily latched as the write data.

(D) In accordance with the EI flag (bit 0) of the EEPROM control register ECR, the erase sequence (E) is executed when EI=0. Erase is made in the page (32 bytes) unit selected by the X decoder. The term "erase" hereby means that the data of the EEPROM memory cell is set at logic "1". Therefore, all the data of the page (32 bytes) are at the logic "1" data after this erase operation is executed. On the other hand, when EI of ECR is EI=1, the flow proceeds to the next sequence without the erase control.

(F) The content of the column latch 31 is written into the page selected by the step (A) described above when WI=0 in accordance with the WI flag (bit 1) of the EEPROM control register ECR (step G). Here, the term "write" means that the write of the "1" data corresponds to the retention of the state of the EEPROM cell before write and the write of the "0" data is to set the state of the EEPROM cell to the "0" data. When WI="1", the control is such as to preclude the write sequence from being effected and the flow proceeds to the next sequence.

(H) The write sequence is completed by setting the $\overline{BSY}$ flag of the ECR to "1".

Next, security of the EEPROM data will be explained with reference to FIGS. 5 through 8.

Figure 5:
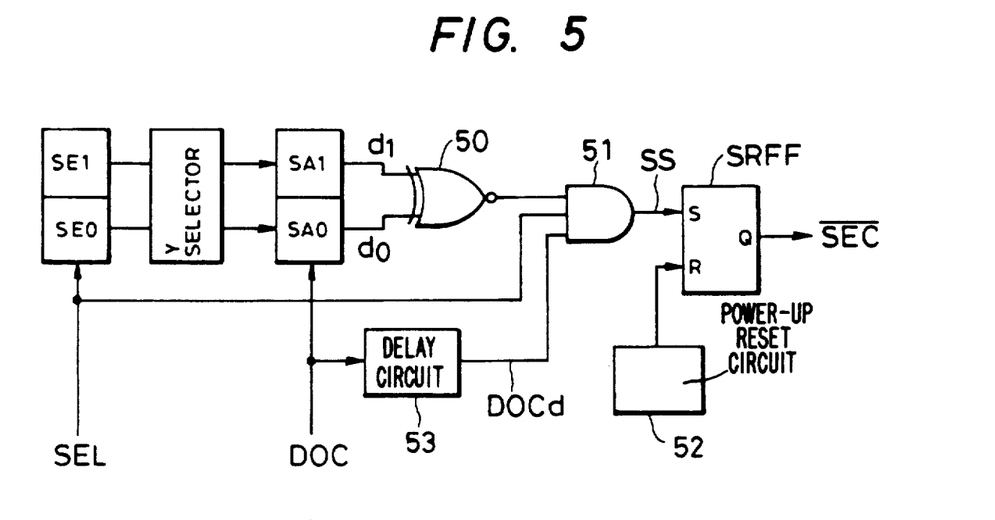
FIG. 5 is a block diagram showing the principle of security.

FIG. 5 shows the principle of effecting security. The EEPROM cells SE1 and SE2 (contained in the security EEPROM shown in FIG. 2) are coupled to circuits SA0 and SA1 for detecting and amplifying the respective data transmitted through the Y selector, and their outputs $d_0$ and $d_1$ are inputted to the ENOR enclosure circuit 50. In other words, when the security EEPROM cells SE1 and SE2 are selected by the selection line SEL and the data output control signal DOC is asserted, the ENOR output becomes the "1" level only when $d_0=d_1$ in accordance with the state of the outputs $d_0$ and $d_1$ of SE0 and SE1.

On the other hand, the ENOR output is inputted to the AND circuit 51. The other inputs to the AND circuit 51 are the output signal DOCd of the delay circuit 53, which delays only the rise of DOCd, and the selection signal on selection line SEL. The output of the AND circuit 51 is coupled to the set input S of the set/reset flip-flop SRFF. The reset input R of SRFF is connected to the output of the power-up reset circuit 52 which generates the reset signal after the turn-on of the power source, and the "0" level is always outputted at the output Q of the SRFF immediately after the turn-on of the power source. This state is defined as the security signal $\overline{SEC}=0$ to represent the security lock state.

Figure 6:
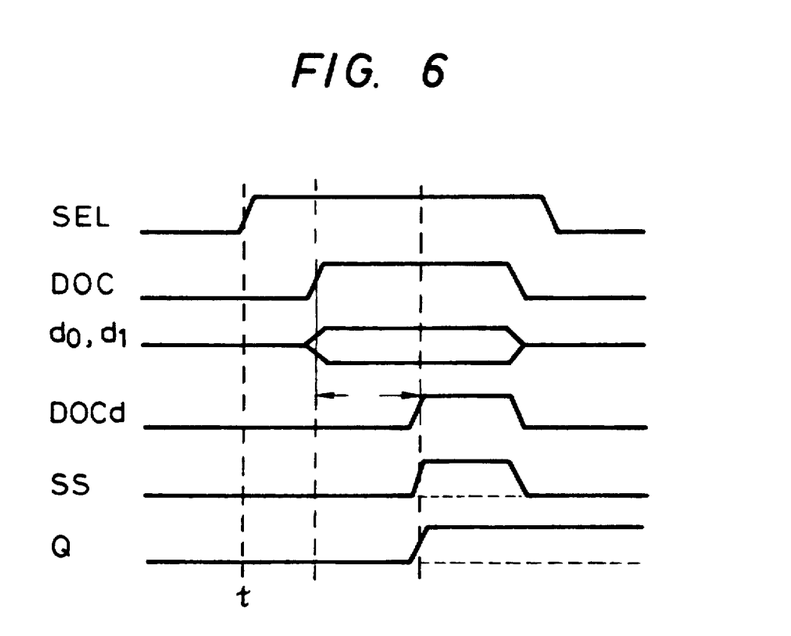
FIG. 6 is a timing chart of FIG. 5.

Next, the set timing of the flip-flop SRFF will be explained with reference to FIG. 6. When the selection signal SEL is asserted and the data output control signal DOC is further asserted, the data $d_0$ and $d_1$ of EEPROM (SE0 and SE1) are determined in synchronism with the rise of DOC. If $d_0=d_1$, the output SS of the AND circuit becomes the "1" level (solid line SS in FIG. 6) in synchronism with the output DOCd of the delay circuit 53 and the output Q of SRFF changes from the "0" level to the "1" level (solid line Q in FIG. 6). When $d_0 \neq d_1$, the "1" level is not outputted to the output SS of the AND circuit 51 in whichever manner SEL and DOC are controlled. In other words, security lock is not released.

Figure 7:
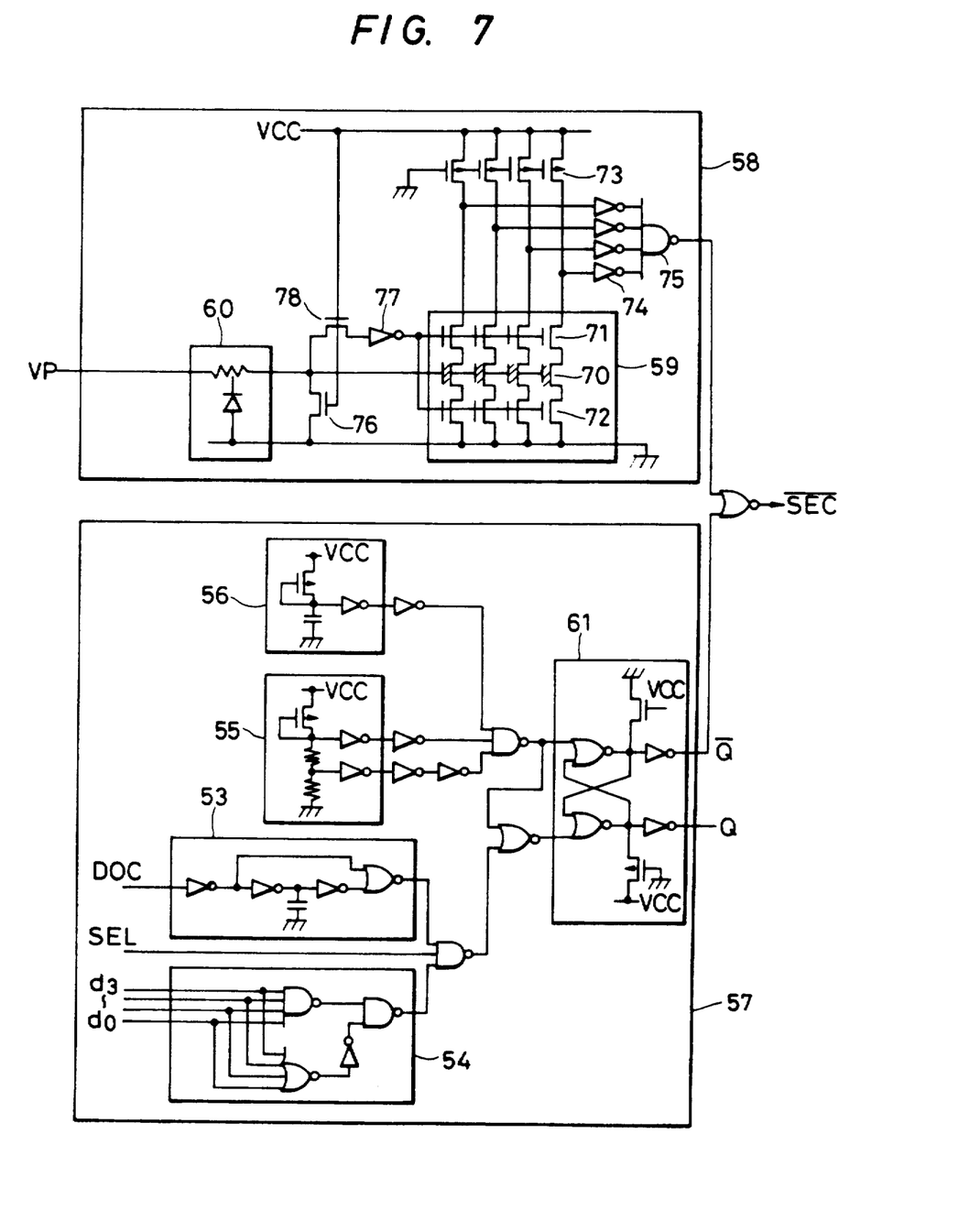
FIG. 7 is a security circuit diagram.

Next, FIG. 7 is a circuit diagram showing in detail this embodiment.

The block represented by reference numeral 57 in FIG. 7 is one that embodies the principle explained with reference to FIGS. 5 and 6. The block includes a set/reset flip-flop 61 which is always reset at the turn-on of the power source and a delay circuit 53 for the output control signal DOC. In order to improve the security function, the security EEPROM (SE0 and SE1) shown in FIG. 5 is expanded to 4 bits (SE0~SE3), an all "1"/all "0" determination circuit 54 is disposed so as to make a coincidence determination of $d_0 \sim d_3$. Furthermore, the block includes a voltage detection circuit 55 which detects that a power source voltage is within a predetermined range such as from 3 to 6 V, and a power-up detection circuit 56 which generates the reset pulse for a predetermined period at the time of turn-on of the power source.

In accordance with the circuit construction described above, the conditions under which the flip-flop 61 is set are as follows:

(1) $d_0 \sim d_3$ are all "1" or all "0".
(2) The power source voltage is within the range of from 3 to 6 V.
(3) The pulse width of DOC is greater than the delay time determined by the delay circuit 53.

The flip-flop 61 is and kept set when all the conditions (1) through (3) are simultaneously satisfied.

On the other hand, the condition under which the flip-flop 61 is reset is either one of the following two conditions:

(1) At the time of turn-on of the power source.
(2) VCC is outside the range of 3 to 6 V.

This embodiment constitutes another sequence of the security circuit shown in the block 58 in FIG. 7.

It consists of four security bits each consisting of an EEPROM cell 70, an isolation MOSFET 72 and an isolation MOSFET 71 that are disposed separately from the EEPROM matrix 10 and the security EEPROM 25 shown in FIG. 2, four load transistors 73 for reading the data of the security bits, each load transistor being connected to a respective bit transistor arrangement and to a respective one of the four inverters 74 for amplifying the data, in addition to the four input NAND circuit 75 receiving the outputs of the four inverters as its inputs, respectively. The gate electrode of each EEPROM cell 70 is connected to the write power source VP through an input protection circuit 60 consisting of an N+ diffusion layer resistor on a P well and a diode. The gate electrode of the EEPROM cell 70 is connected to MOSFET 76 in order to fix it to the ground potential when VP is open. The gate electrodes of isolation MOSFETs 71 and 72 are connected to the same wiring as the gate electrodes of the EEPROM cells 70 through the inverter 77 and the MOSFET 78 used for high voltage limitation.

The threshold voltage $V_{th}$ of the EEPROM cells, as-produced from the semiconductor production process, is generally about $-0.5$ V (hereinafter called "$V_{th}L$"). Therefore, when the VP electrode is open or is set to the ground potential, the cell is conductive. At this time, since the isolation MOSFETs 71 and 72 are on, the condition of $V_{th\,L}$ can be detected by suitably designing the load transistor 73 and the inverter 74. In order to shift the threshold value $V_{th}$ of the EEPROM cell to the high level (hereinafter called "$V_{th\,H}$"), the potential of the well including the EEPROM cell 70 is set to the ground level and a voltage of about +15 V is applied to VP for a period of 1 to 10 ms. At this time, $V_{th\,H}$ is about +3 V. When the voltage to be applied to VP exceeds the threshold value $V_{th\ (INV)}$ of the inverter 77, the inverter changes its logic state and the isolation transistors 71, 72 become OFF. When VP is open or set to the ground level while the threshold value is $V_{th\ H}$, the EEPROM cell 70 is OFF while the isolation transistors 71, 72 are ON, so that $V_{th\ H}$ is detected by the load transistor 73 and the inverter 74. Each security bit is represented by one or more units each including a combination of a series arrangement of transistors 70–73 and logic inverter 74; note that four such units are illustrated in FIG. 7.

The protection circuit 60 prevents the application of a positive voltage which is higher than the write voltage or the application of a negative voltage to the gate of the EEPROM cell 70.

As described above, the first and second security circuits 57 and 58 are disposed and the logic nor of these circuits is calculated so as to reinforce the security function.

Another embodiment which uses the security circuits described above and which accomplishes easy testability of an EEPROM and data security after the test will be described with reference to FIG. 8.

An EEPROM 100 is connected to CPU 101 through the data bus DB and the address bus AB. Address bus AB and data bus D are connected to the address port 102 and the data port 103 that provide the address and data from outside the semiconductor integrated circuit at the time of the EEPROM test, respectively. Write and read operations of the EEPROM are controlled by the control signals CS, RD and WR.

The test mode is discriminated by the EEPROM test signal. When ET=0, the mode is a CPU mode, whereby the address input from the address port 102 and the data input/output from the data port 103 are inhibited. The address for an EEPROM is outputted only from CPU 101 and is given to the EEPROM 100 through the address bus AB. The data is inputted and outputted to and from CPU 101 through the data bus DB. As to the control signals, the input from the external terminals $\overline{CE}$, $\overline{OE}$ and $\overline{WE}$ is inhibited while the control signals $\overline{WE'}$, $\overline{OE'}$ and $\overline{CE'}$ are inputted from CPU.

When ET="1", the mode is the EEPROM test mode. At this time, the output from CPU to the data bus DB and the address bus AB is inhibited, and the addresses $A_0 \sim A_{11}$ are inputted to the address bus AB from outside the semi-conductor integrated circuit. Further, the EEPROM control signals $\overline{CE}$, $\overline{OE}$ and $\overline{WE}$ are applied from outside the semiconductor integrated circuit. The interface between the data bus DB and outside the semiconductor integrated circuit is effected through the data port 103, and the data port is operative only when the output $\overline{SEC}$ of the security circuit 104 described with reference to FIG. 8 is "1".

In this embodiment, the reset terminal $\overline{RES}$ of the microcomputer is changed over by the EEPROM test signal ET and is used for controlling the erase of all the bits and the write of all the bits. In this case, reset (RESET=0) is forcedly applied to the CPU. The all bit mode is selected when ET="1" and $\overline{RES}$="1". When $\overline{SEC}$="1", all "1" are applied to $D_0 \sim D_7$ under $\overline{CE}$="0" and $\overline{OE}$="1" to establish $\overline{WE}$="0". In this case, the all bit erase sequence is started and the data of EEPROM becomes all bit "1".

When $\overline{WE}$ is set to $\overline{WE}$="0" by applying all "0" to $D_0 \sim D_7$ under $\overline{CE}$="0" and $\overline{OE}$="1", the all bit write sequence is started and the data of the EEPROM becomes all bit "0".

When $\overline{SEC}$="0", the all bit erase sequence is started by setting $\overline{WE}$ to $\overline{WE}$="0" under $\overline{CE}$="0" and $\overline{OE}$="1" and the data of the EEPROM becomes all bit "1". The term "EEPROM" hereby designates 16,384 bits of the EEPROM memory matrix 10 and 256 bits of the security EEPROM 25 shown in FIG. 2 (including SE0 ~ SE3) but does not include the EEPROM cell 70 shown in FIG. 7.

Figure 8:
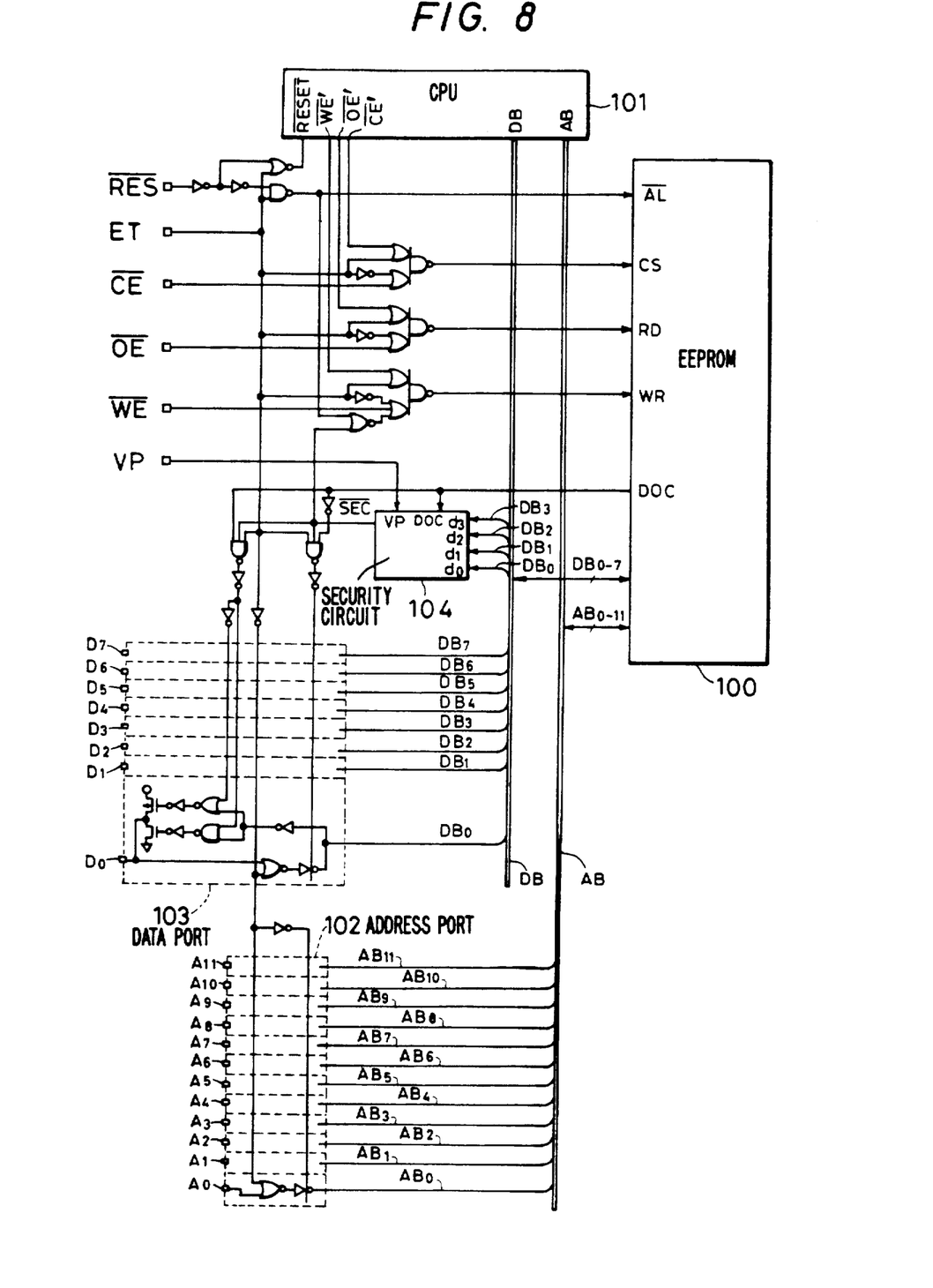
FIG. 8 is an overall view of the security.

When the all bit erase or the all bit write is executed, the data of the security EEPROM becomes all "0" or all "1", and $d_0 \sim d_3$ shown in FIG. 8 becomes all "0" and all "1", whereby the condition for the security release is established and the EEPROM test from outside the semiconductor integrated circuit becomes possible.

Next, the operation sequence from the as-produced state of the semiconductor integrated circuit of the present invention, where write or erase is not at all effected, up to the EEPROM test and the data security will be explained.

(1) Under the state where the EEPROM test signal ET shown in FIG. 8 is "1", the address for selecting the security EEPROM (25 in FIG. 2) is given from $A_0 \sim A_{11}$ and $\overline{OE}$ is set to "0" under $\overline{CE}$="0" and $\overline{WE}$="1". Then, $\overline{SEC}$ in FIG. 8 becomes "1" and the data port 103 becomes "enable". Under this state, direct access to the EEPROM becomes possible from the external terminal and the EEPROM test can be made.

(2) After the test is completed, the data other than all "0" or all "1" are written to the security bits ($SE_0 \sim SE_3$). From the next turn-on of the power source, the data port 103 does not become "enable" even when the procedure of (1) is effected so that direct access from outside the semiconductor integrated circuit is inhibited and the data security of the EEPROM can be secured.

(3) In order to establish once again the EEPROM testable state, that is, the state of (1) described above, $\overline{WE}$ is set to "0" under ET="1", $\overline{RES}$="1", $\overline{CE}$="0" and $\overline{OE}$="1", whereby the data of the memory matrix (10 in FIG. 2) are erased and at the same time, the security bit (25 in FIG. 2) is erased, too, so that the test becomes possible after the procedure of (1).

(4) When a high voltage is applied to VP in FIG. 8 and the threshold value $V_{th}$ of the EEPROM cell 70 is set to a high level, the test mode cannot be returned permanently.

Figure 9:
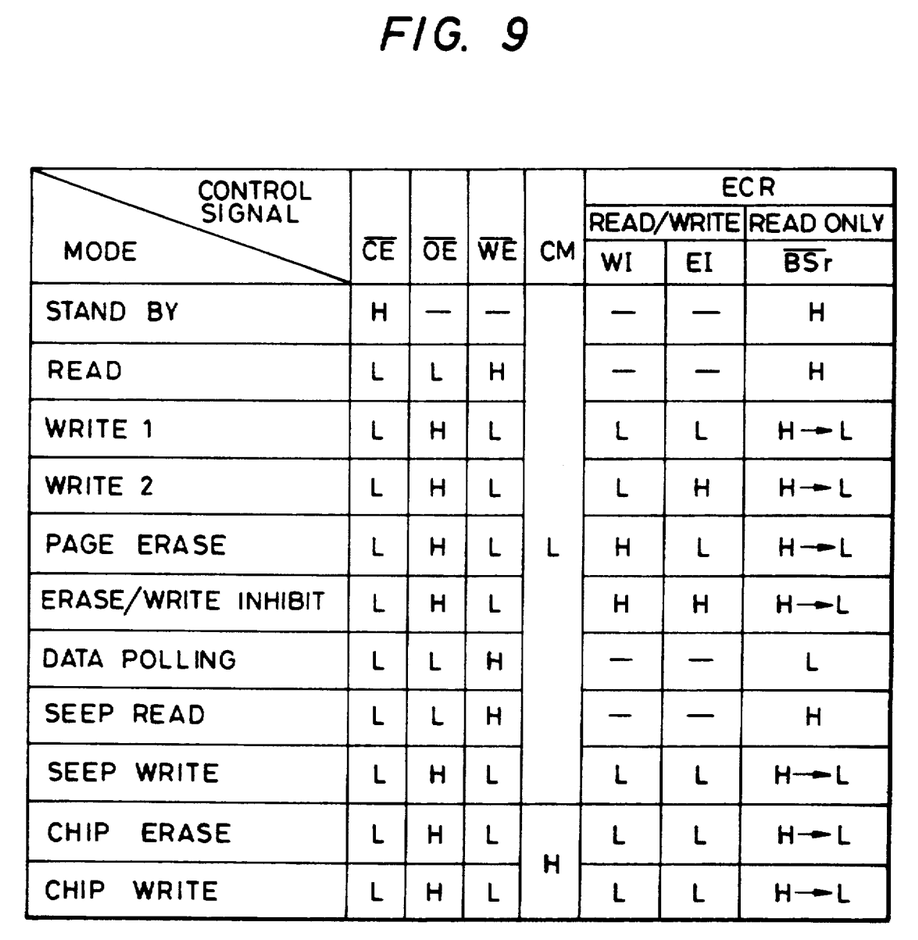
FIG. 9 is an explanatory view of an EEPROM mode.

The modes of the EEPROM and the mode selection will be explained with reference to FIG. 9. Here, the CM signal is the input signal from outside the semiconductor integrated circuit which is used for the EEPROM test. It is a control signal (corresponding to the $\overline{RES}$ signal in the EEPROM test mode in FIG. 8) that determines whether all the EEPROM cells are selected or they are selected in accordance with the page unit.

Stand-by:

The EEPROM module is stand-by when $\overline{CE}$="H".

Read:

One byte of the EEPROM is read out in accordance with the input address data.

Figure 4:
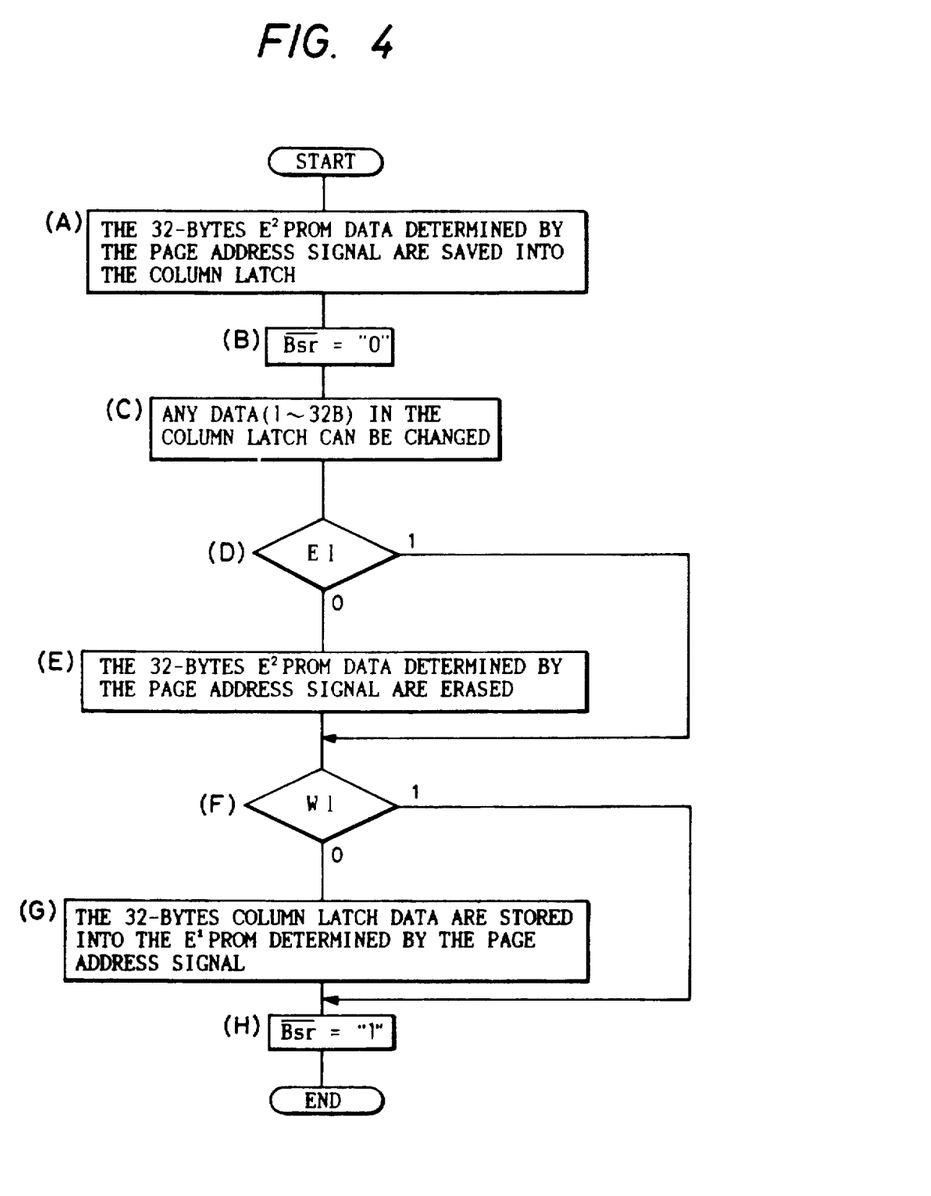
FIG. 4 is a control sequence diagram of an EEPROM.

Write 1:

(A), (B), (C), (E), (G) and (H) of the sequence shown in FIG. 4 are executed.

Write 2:

(A), (B), (C), (G) and (H) of the sequence shown in FIG. 4 are executed.

Page Erase:

(A), (B), (C), (E) and (H) of the sequence shown in FIG. 4 are executed.

Erase/Write Inhibit:

The sequence (A), (B), (C) and (H) of FIG. 4 are executed.

Data Polling:

When the EEPROM is read while $\overline{\text{BSY}}$ = "0", the data during read out is inverted in an order so that the most significant bit of the data that is written last is read out first. The logic "0" is outputted for the least significant 7 bits.

SEEP Read:

The security EEPROM storing the security data is selected in accordance with the address data, and its data is read out.

SEEP Write:

The security EEPROM is selected in accordance with the address data, and the security data is written.

Chip Erase:

All the bits of the EEPROM in the data area and the security area are set to "1".

Chip Write:

All the bits of the EEPROM in the data area and the security area are set to "0".

All the modes described above can be selected in the EEPROM test mode but in the access mode from CPU, SEEP Read/Write and Chip Erase/Write are inhibited.

As described above, this embodiment makes it possible to test an EEPROM without using the CPU function of the microcomputer and to improve the test efficiency of the semiconductor integrated circuit. Furthermore, after the test is completed, this embodiment can secure the data security of an EEPROM by inhibiting direct access to an EEPROM from outside the semiconductor integrated circuit but allows direct access from only CPU.

Furthermore, since the registers for controlling EEPROMs are disposed, this embodiment can expand the operation modes of an EEPROM, that is, write in the page unit while inhibiting erase, erase in the page unit and the erase and write inhibition function.

As described above, the present invention provides the semiconductor integrated circuit which can easily test its built-in EEPROM in the semiconductor integrated circuits with the built-in EEPROM for the microcomputer or the like, and which has the data security function inhibiting the direct output of the data from outside the semiconductor integrated circuit after the test is completed.

Furthermore, the present invention can improve the program efficiency of the microcomputer and the write protection by reinforcing the write function of the built-in EEPROM.

What is claimed is:

1. A semiconductor integrated circuit formed on a semiconductor body, comprising:

a central processing unit (CPU) for processing data;
   memory means for storing data and being able to be controllably accessed;
   a common bus, including at least a data bus, coupled to said central processing unit and coupled to said memory means;
   first inhibition means, coupled to said data bus, providing a first inhibiting operation thereby preventing access operations to said memory means from outside said semiconductor body, via said data bus, said first inhibition means releasing said first inhibiting operation in response to a signal from outside said semiconductor body; and
   second inhibition means, coupled to said data bus, providing a second inhibiting operation thereby preventing access operations to said memory means from outside said semiconductor body, via said data bus, and permanently disabling the access operations to said memory means from outside said semiconductor body irrespective of a releasing of said first inhibiting operation after said second inhibiting operation takes effect.

2. A semiconductor integrated circuit according to claim 1, wherein said integrated circuit is a microcomputer.

3. A semiconductor integrated circuit according to claim 2, wherein said memory means is a programmable read only memory (PROM).

4. A semiconductor integrated circuit according to claim 3, wherein said PROM is an electrically erasable and programmable read only memory (EEPROM).

5. A semiconductor integrated circuit according to claim 3, wherein said programmable read only memory comprises a first PROM region and a second PROM region, each of said first and second PROM regions is accessible for write and read operations, and wherein the write and read operations of said first PROM region are selectively controlled in response to control signals from said CPU via said common bus, and external signals received from outside said semiconductor body, and the write and read operations of said second PROM region are controlled by said external signals.

6. A semiconductor integrated circuit according to claim 5, further including read means, coupled to said PROM for reading out data from said first and second PROM regions to said data bus.

7. A semiconductor integrated circuit according to claim 6, wherein said read means includes a sense amplifier.

8. A semiconductor integrated circuit according to claim 6, wherein said PROM is an electrically erasable and programmable read only memory (EEPROM) including first and second EEPROM regions corresponding to said first and second PROM regions, respectively.

9. A semiconductor integrated circuit according to claim 8, wherein said second EEPROM region includes an area for write/read inhibition binary data which is input from outside said semiconductor body via said data bus, and said first inhibition means operates in response to said inhibition binary data.

10. A semiconductor integrated circuit according to claim 9, wherein memory location selection in said EEPROM is effected in response to an address signal from said CPU during a non-testing mode of said microcomputer and during a test mode thereof memory location selection in said EEPROM is effected in response to an address signal received from outside said semiconductor body.

11. A semiconductor integrated circuit according to claim 10, wherein said external signals are received during said test mode and said control signals are received from said CPU, via said common bus, during the non-testing mode.

12. A semiconductor integrated circuit according to claim 11, wherein said read means is coupled to said first and second EEPROM regions via a decoder circuit for reading out data to said data bus during the non-testing and testing modes, respectively.

13. A semiconductor integrated circuit according to claim 12, wherein said read means includes a sense amplifier.

* * * * *